United States Patent
Kim et al.

(10) Patent No.: US 9,437,234 B1
(45) Date of Patent: Sep. 6, 2016

(54) HEAD-MEDIUM CONTACT DETECTION USING HIGH FREQUENCY HEATER OSCILLATION

(71) Applicant: Seagate Technology LLC, Cupertino, CA (US)

(72) Inventors: Shi Jung Kim, Yongin (KR); Dong Wook Lee, Yongin (KR); Ju Yong Lee, Yongin (KR); Won Choul Yang, Kowloon (HK)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/831,314

(22) Filed: Aug. 20, 2015

(51) Int. Cl.
| | |
|---|---|
| G11B 5/60 | (2006.01) |
| G11B 7/1263 | (2012.01) |
| G11B 20/18 | (2006.01) |
| G11B 5/31 | (2006.01) |
| G11B 5/00 | (2006.01) |

(52) U.S. Cl.
CPC ........... *G11B 5/6076* (2013.01); *G11B 5/3136* (2013.01); *G11B 5/607* (2013.01); *G11B 5/6052* (2013.01); *G11B 7/1263* (2013.01); *G11B 20/18* (2013.01); *G11B 2005/0021* (2013.01)

(58) Field of Classification Search
CPC .... G11B 5/607; G11B 5/6076; G11B 5/3136
USPC ............................... 360/125.31, 125.3, 294.7
See application file for complete search history.

(56) References Cited

U.S. PATENT DOCUMENTS

| | | | |
|---|---|---|---|
| 7,158,325 B1 | 1/2007 | Hu et al. | |
| 7,423,830 B2 * | 9/2008 | Ma | G11B 5/40 360/75 |
| 8,638,349 B1 | 1/2014 | Liu et al. | |
| 8,654,618 B1 | 2/2014 | Liu et al. | |
| 8,717,702 B2 | 5/2014 | Zeng et al. | |
| 8,730,602 B2 | 5/2014 | Yang | |
| 8,730,611 B2 | 5/2014 | Liu et al. | |
| 8,837,076 B1 | 9/2014 | Cheng et al. | |
| 8,995,076 B1 | 3/2015 | Olson et al. | |
| 9,047,898 B2 | 6/2015 | Liu et al. | |
| 9,053,740 B1 * | 6/2015 | Sharma | G11B 21/025 |
| 9,202,499 B2 * | 12/2015 | Kiely | G11B 5/3116 |
| 2011/0299367 A1 * | 12/2011 | Naniwa | G11B 5/3106 369/13.33 |
| 2012/0050907 A1 | 3/2012 | Haapala | |
| 2012/0113207 A1 * | 5/2012 | Zheng | B41J 2/355 347/209 |
| 2012/0201108 A1 * | 8/2012 | Zheng | G11B 5/607 369/13.26 |
| 2013/0286802 A1 * | 10/2013 | Kiely | G11B 13/04 369/13.31 |
| 2014/0269241 A1 * | 9/2014 | Zhou | G11B 5/607 369/53.39 |

* cited by examiner

*Primary Examiner* — Jefferson Evans
(74) *Attorney, Agent, or Firm* — Hollingsworth Davis, LLC

(57) ABSTRACT

An apparatus comprises a read/write head having a heater, wherein a low- or non-modulation interface is defined between the head and a magnetic recording medium. A microactuator is coupled to the head. A main actuator is coupled to the microactuator and the head. A controller is coupled to the main actuator, the microactuator, and the head. The controller is configured to control movement of the main actuator and the microactuator in response to a position error signal. The controller is further configured to induce an oscillation in the heater at a predetermined frequency. A detector is coupled to the controller. The detector is configured to sense a disturbance in the PES supplied to the microactuator resulting from the induced heater oscillation, and detect contact between the head and the medium using the PES disturbance.

23 Claims, 10 Drawing Sheets

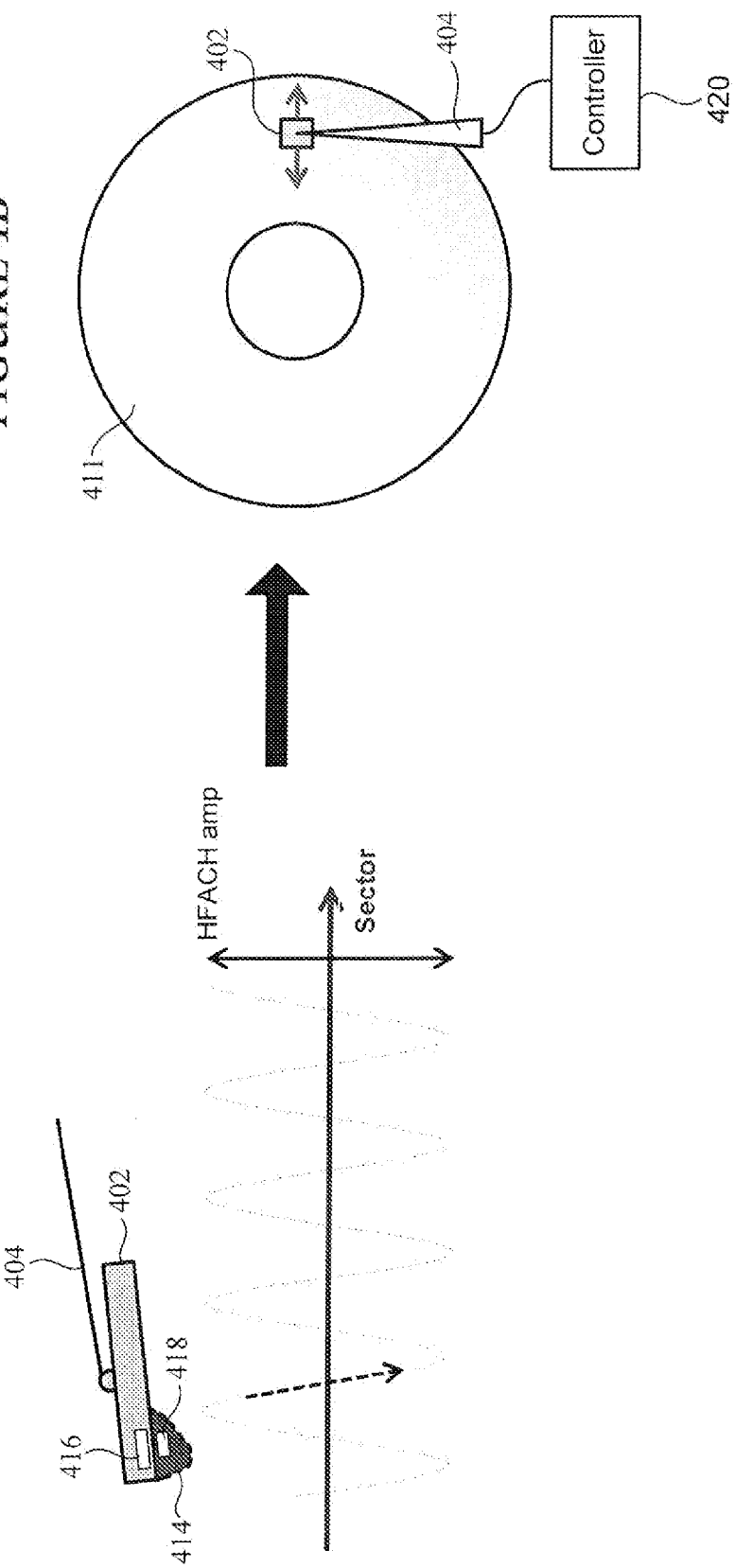

HEAD-MEDIUM CONTACT DETECTION USING HIGH FREQUENCY HEATER OSCILLATION

SUMMARY

Embodiments are directed to a method comprising providing relative movement between a read/write head and a magnetic recording medium, wherein a low- or non-modulation interface is defined between the head and medium, and the head is movable by a microactuator and a main actuator. The method also comprises inducing an oscillation in a heater of the head at a predetermined frequency, and sensing a disturbance in a position error signal (PES) supplied to the microactuator resulting from the induced heater oscillation. The method further comprises detecting contact between the head and the medium using the PES disturbance.

Various embodiments are directed to an apparatus comprising a read/write head having a heater, wherein a low- or non-modulation interface is defined between the head and a magnetic recording medium. A microactuator is coupled to the head. A main actuator is coupled to the microactuator and the head. A controller is coupled to the main actuator, the microactuator, and the head. The controller is configured to control movement of the main actuator and the microactuator in response to a position error signal. The controller is further configured to induce an oscillation in the heater at a predetermined frequency. A detector is coupled to the controller. The detector is configured to sense a disturbance in the PES supplied to the microactuator resulting from the induced heater oscillation, and detect contact between the head and the medium using the PES disturbance.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 4A illustrates a read/write head configured for implementing contact detection for a low- or non-modulation HDI in accordance with various embodiments;

FIG. 4B illustrates a read/write head moving relative to a magnetic recording medium and a controller configured to implement contact detection for a low- or non-modulation HDI in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to detecting contact between a read/write head (e.g., a slider) and a magnetic recording medium for a low- or non-modulation head-disk-interface defined between the head and the medium. In a low- or non-modulation HDI, the air bearing is relatively stiff. The relatively stiff air bearing makes it challenging to detect head-medium contact events using techniques that rely on modulation of the air bearing or a sensor/component of the read/write head. Embodiments of the disclosure are directed to apparatuses and methods that provide for reliable detection of head-medium contact events for low- or non-modulation HDIs.

Figure 1:
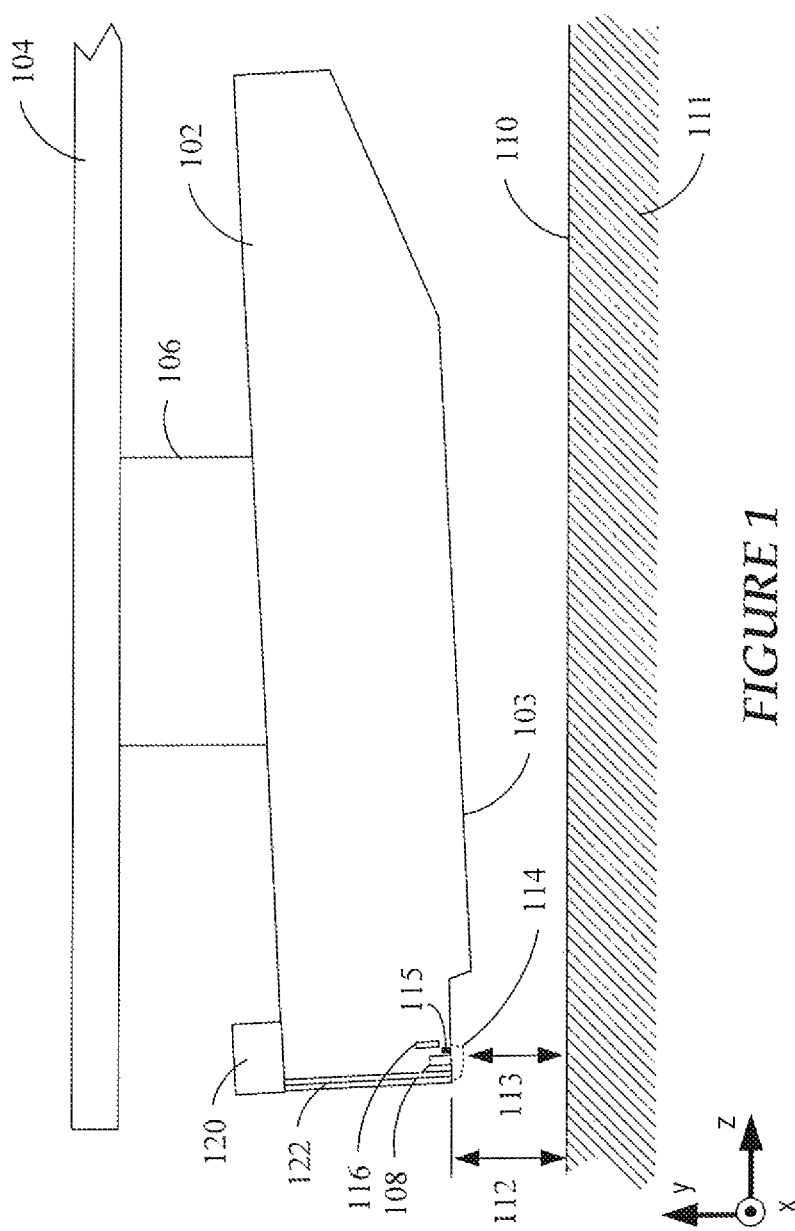
FIGS. 1 and 2 show side views of a slider with which embodiments of the present disclosure can be implemented.

FIG. 1 shows a side view of a read/write head 102 configured for magnetic recording according to a representative embodiment. In some embodiments, the read/write head 102 is configured for heat-assisted magnetic recording (HAMR). The read/write head 102 may be used in a magnetic data storage device, e.g., a hard disk drive. The read/write head 102 may also be referred to herein as a slider, read head, recording head, etc. The read/write head 102 is coupled to an arm 104 by way of a suspension 106 that allows some relative motion between the read/write head 102 and arm 104. The read/write head 102 includes read/write heads 108 at a trailing edge that are held proximate to a surface 110 of a magnetic recording medium 111, e.g., magnetic disk. In HAMR embodiments, the read/write head 102 further includes a laser 120 and a waveguide 122. The waveguide 122 delivers light from the laser 120 to components (e.g., a near-field transducer) near the read/write heads 108.

When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface 103 (also referred to herein as a "media-facing surface") of the read/write head 102 when the recording medium 111 is rotating. It is desirable to maintain a predetermined slider flying height 112 over a range of disk rotational speeds during both reading and writing operations to ensure consistent performance. Region 114 is a "close point" of the read/write head 102, which is generally understood to be the closest spacing between the read/write heads 108 and the magnetic recording medium 111, and generally defines the head-to-medium spacing 113.

To account for both static and dynamic variations that may affect slider flying height 112, the read/write head 102 may be configured such that a region 114 of the read/write head 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write heads 108, such as near the near-field transducer) or can be positioned at another location of an air bearing surface (ABS) 103 of the read/write head 102.

Figure 2:
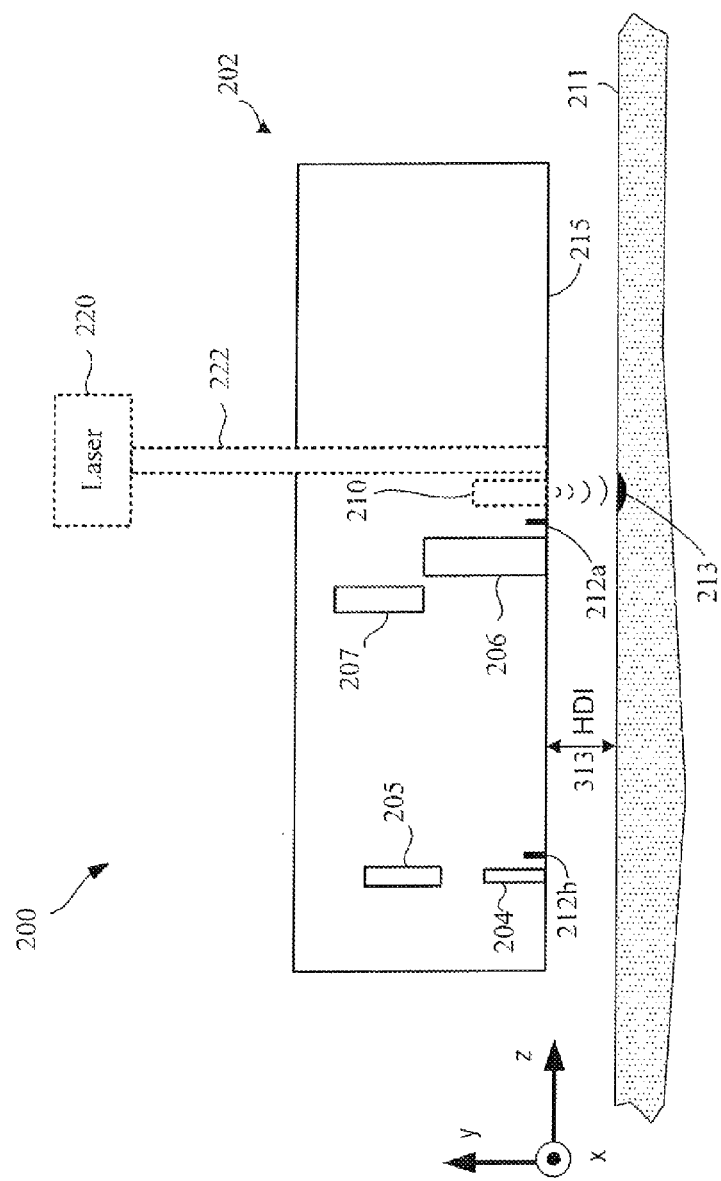

FIG. 2 shows a read/write head arrangement 200 in accordance with various embodiments. The read/write head arrangement 200 includes a slider 202 positioned proximate a rotating magnetic medium 211. The slider 202 includes a reader 204 and a writer 206 proximate the ABS 215 for respectively reading and writing data from/to the magnetic medium 211. In HAMR embodiments, the writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212a, 212b can be situated at various locations on the slider 202 at or near the ABS 215 for purposes of monitoring temperature, head-medium spacing changes, and head-medium contact in some embodiments.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot 213 on the medium 211.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

For an accurate write and read operations to occur, it is desirable to have a relatively small distance or spacing between a read/write head and its associated magnetic recording medium. This distance or spacing is known as "fly-height" or "head-medium spacing." By reducing the fly height, a read/write head is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems. Higher contact detection repeatability enables lower active clearance, and thus higher recording density. Higher contact detection sensitivity reduces wear and improves reliability.

Contact detection may be performed before the head-disk system begins any type of recording. Contact detect may be performed on a head-by-head basis and can require significant interaction time between head and disk. Today, many systems implement a contact detection scheme which involves determining the heater power necessary to cause thermal expansion of the slider (head) from a passive fly condition to intermittent head-disk contact. This intermittent contact may cause significant modulation of the slider fly height. The modulation of slider fly height then results in modulation of heat transfer between the head and disk. A thermal proximity sensor, for example a dual ended temperature coefficient of resistance (DETCR) sensor, can easily pick up these relatively large fluctuations in head-disk heat transfer. The readings from the thermal proximity sensor in combination with the heater power can be used to establish contact detection.

However, newly developed low clearance technology (LCT) head-disk systems have reduced or eliminated fly height modulation due to intermittent head-disk contact. The reduction/elimination of fly height modulation has beneficially resulted in the reduced wear of the head during contact detect and unintended head-disk interaction. However, it has also unfortunately resulted in the reduction of contact detect strength by the sensors, and/or techniques, that rely on the fly height modulation. As such, in response to the contact detect challenges presented by LCT head-disk systems, a low-frequency AC heater (LFACH) contact detect scheme has been developed. In LFACH, the amplitude of the heater voltage/power follows an oscillation that causes the fly height to follow the same oscillation. The thermal proximity sensor (e.g., DETCR) in the head detects the oscillation and produces an oscillating sensor signal, which when combined with the heater power can be used to determine the contact detect.

In some cases, LFACH has its own limitations in that it may be limited to low heater frequencies, such as those under 1 kHz. At higher frequencies, the fly height does not respond to fluctuations in the power dissipated at the heater. One limitation to heater-induced fly modulation is the thermal time constant for heating the portion of the slider that forms a thermal protrusion. This involves the slider reaching a steady "hot" temperature, with a protrusion and reduced clearance, then cooling to a steady state "cold" temperature with reduced protrusion and increased clearance. If the heater voltage is oscillated too quickly, the slider temperature, as well as the resultant protrusion and clearance, do not have time to respond to the oscillating heater signal and contact detect by LFACH fails. It is noted that thermal time constraints for heater-induced expansion/retraction may be ~400-500 µs, in which case heater induced fly modulation can be limited to under about 1 kHz.

Embodiments of the disclosure are directed to detecting contact between a read/write head (e.g., a slider) and a magnetic recording medium for low- or non-modulation head-disk-interfaces defined between the head and the medium (e.g., as in LCT head-disk systems). As was discussed previously, in a low- or non-modulation HDI, the air bearing is relatively stiff. Because the HDI is a low- or non-modulation interface, a temperature signal produced by a thermal contact sensor, for example, is substantially devoid of a varying signal component during head-medium contact. More particularly, the temperature signal is substantially devoid of an AC component during head-medium contact. Although there may be a small RMS component of the temperature signal, any such RMS component is not usable in the context of conventional contact detection schemes that rely on head-disk modulation. It has also been found that techniques that use modulation in a position error signal to detect head-medium contact are unreliable and cannot be used to declare head-medium contact events (due to the very small resulting vibrations) for low- or non-modulation HDIs.

Figure 3:
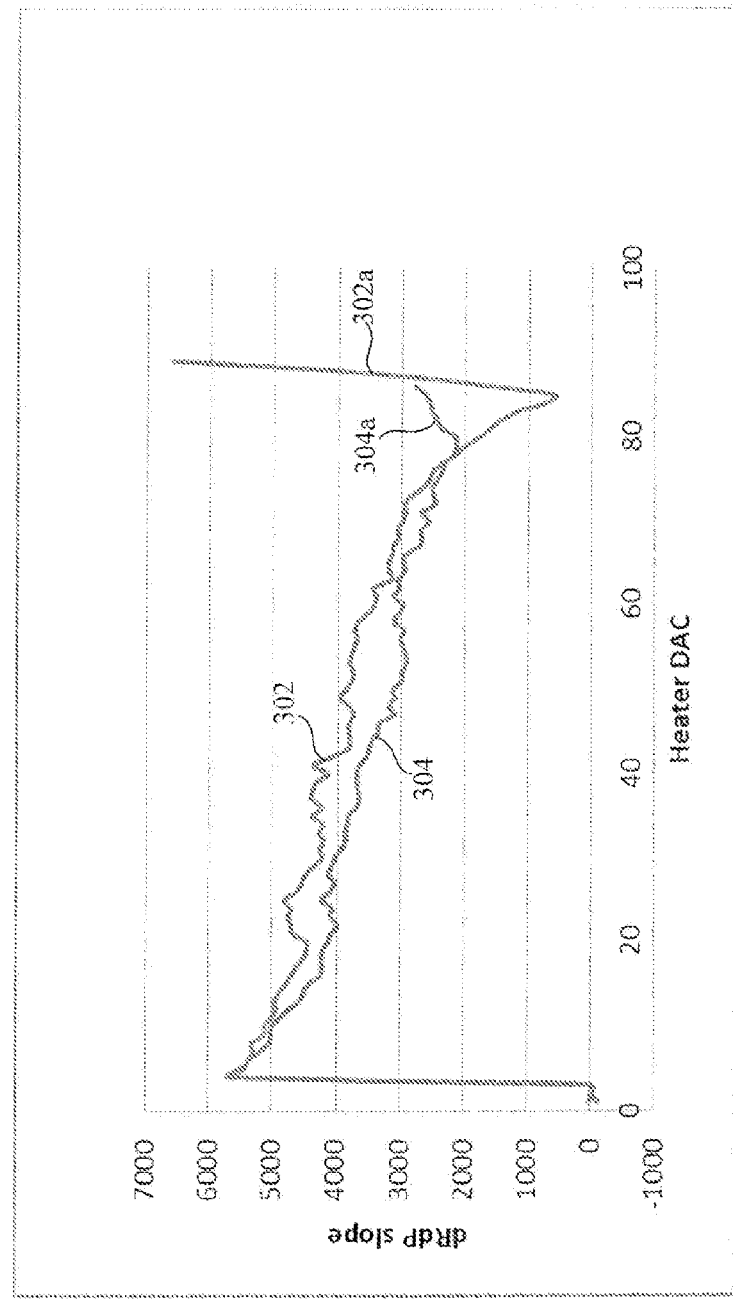
FIG. 3 graphically illustrates the touchdown response of a thermal contact sensor for a conventional head-disk interface (HDI) and a low- or non-modulation HDI.

FIG. 3 graphically illustrates the touchdown response of a thermal contact sensor for a conventional HDI (curve 302) and a low- or non-modulation HDI (curve 304). The y-axis of the graph shown in FIG. 3 is given as dR/dP slope (often represented as ΔR/ΔP), where dR is the change in resistance (temperature) of the sensor and dP is the change in heater power. The x-axis is given by heater DAC counts, which corresponds to the amount of power supplied to the heater of the read/write head that is used during contact detection. It can be seen in FIG. 3 that the ratio of dR/dP slope decreases for curves 302 and 304 with a better cooling condition due to a reduction in the fly height, and reaches a minimum at head-medium contact (at around a heater DAC count of 83). The value of dR/dP slope increases (see 302a and 304a) after head-medium contact due to frictional heating.

FIG. 3 illustrates a dramatic difference between the head-medium contact signatures (302a and 304a) produced by a convention HDI and a low- or non-modulation HDI. The head-medium contact signature 302a for the convention HDI presents a very steep and pronounced increase in dR/dP slope at the time of head-medium contact, which is evidenced by the spike 302a in the curve 302. In stark contrast, the head-medium contact signature 304a for the low- or non-modulation HDS presents a very modest increase in dR/dP slope at the time of head-medium contact, as is evidenced by a slight increase in slope at 304a of the curve 304. The stiffness of the air bearing of a low- or non-modulation HDI makes it challenging to reliably and accurately detect head-medium contact events.

FIG. 4A illustrates a read/write head configured for implementing contact detection for a low- or non-modulation HDI in accordance with various embodiments. The read/write head shown in FIG. 4A includes a slider 402 supported by a dual stage actuator (DSA) 404. Details of the DSA 404 are discussed hereinbelow. A heater 416 is provided at the head 402 and is controlled to cause development of a protrusion at a region 414 of the slider proximate a reader 418 due to thermal expansion of material at the region 414. An AC signal is supplied to the heater 416 to induce cyclic heating at the region 414. A conventional approach to cyclically heating the region 414 for purposes of conducting contact detection (e.g., LFACH) involves supplying a low-frequency AC heater signal to the heater 416 at a frequency that allows a temperature change in the heater 416 to response to the induced heater oscillations. The material at the region 414 has a thermal time constant beyond which the material is unable to thermally expand and contract in response to an AC heater signal. Typical materials used in a read/write head support a maximum thermal oscillation frequency of less than about 1 kHz. As such, conventional contact detection techniques that rely on induced heater oscillations supply a low-frequency AC signal to the heater 416 at frequencies lower than about 1 kHz. It is known that supplying an AC heater signal to the heater 416 above a frequency corresponding to the thermal time constant of the material at the region 414 (e.g., above 1 kHz) results in a reduction of the amplitude of the mechanical modulation at the slider 402. As such, it would appear undesirable to supply AC signals to the heater 416 above about 1 kHz for purposes of conducting contact detection.

According to embodiments of the disclosure, a relatively high frequency AC signal is supplied to the heater 416 for purposes of conducting contact detection. In this regard, contact detection methodologies of the present disclosure are generally referred to herein as HFACH (high-frequency AC heater) contact detection techniques. According to various embodiments, the reduction in amplitude of the mechanical modulation at the slider 402 resulting from application of the relatively high frequency AC signal (in comparison to a low frequency AC signal below 1 kHz) to the heater 416 is offset by the benefit of enhancing detection of the slider modulation above a frequency (or within a frequency range) that facilitates reliable detection of head-medium contact.

In some embodiments, the AC signal supplied to the heater 416 is above about 1 kHz. For example, the AC signal supplied to the heater 416 can have a frequency above a frequency corresponding to the thermal time constant of the material at the region 414. In other words, the frequency of the AC signal supplied to the heater 416 preferably induces a mechanical oscillation in the heater 416 at a frequency greater than a frequency at which the heater temperature can respond to the AC signal. In some embodiments, the frequency of the AC signal supplied to the heater 416 is higher than about 3-4 kHz. For example, the frequency of the AC signal supplied to the heater 416 can fall within a range between about 3 and 8 kHz.

In various embodiments, the frequency of the AC signal supplied to the heater 416 is higher than the frequency bandwidth of the actuator (voice coil motor) used to position the slider 402 relative to the medium 411. Exciting the slider 402 to a frequency above the frequency bandwidth of the actuator allows for reliable detection of slider oscillation at the AC signal frequency during a head-medium contact event.

FIG. 4A illustrates oscillation of the slider 402 relative to a data sector on a magnetic recording medium, such as medium of 411 shown in FIG. 4B. Driving the heater 416 with an AC signal (e.g., above 1 kHz, such as above about 3-4 kHz) induces oscillation in the fly height or spacing between the slider 402 and the medium 411. The slider 402 is induced to oscillate along a z-direction normal to a plane of the medium 411 in response to the heater oscillation. During oscillation of the slider 402, magnetic transitions corresponding to servo data on the medium 411 are read by the reader 418. The servo data read by the reader 418 is used by a controller 420, via a position error signal, to accurately position the slider 402 within a data track of the medium 411.

Prior to a head-medium contact event, the induced slider oscillation results in substantially random excitation of the slider 402 along an x-direction parallel with the plane of the medium 411. The substantially random excitation of the slider 402 relative to the servo data prior to a head-medium contact event results in production of a PES by the controller 420 that includes substantially random signal content. During a head-medium contact event, the induced slider oscillation results in excitation of the slider 402 relative to the servo data at the frequency of the AC signal supplied to the heater 416. The frequency-specific excitation of the slider 402 that occurs during head-medium contact causes a disturbance in the PES at the frequency of the AC signal supplied to the heater 416.

In response to the PES disturbance resulting from head-medium contact, the controller 420 attempts to compensate for the PES disturbance. A sudden change in the effort of the controller 420 to compensate for the PES disturbance can be used to detect head-media contact. In some embodiments, a compensating signal produced by the controller 420 when responding to the sudden change in control effort is a signal that controls a voice coil motor. In other embodiments, a compensating signal produced by the controller 420 when responding to the sudden change in control effort is a signal that controls a microactuator, such as a microactuator of the dual stage actuator 404 shown in FIG. 4A. It has been found that monitoring for abrupt changes in the control effort of a microactuator provides for enhanced detection of head-medium contact events that would otherwise go undetected if only monitoring control effort of the actuator (e.g., main or course actuator).

Figure 5A:
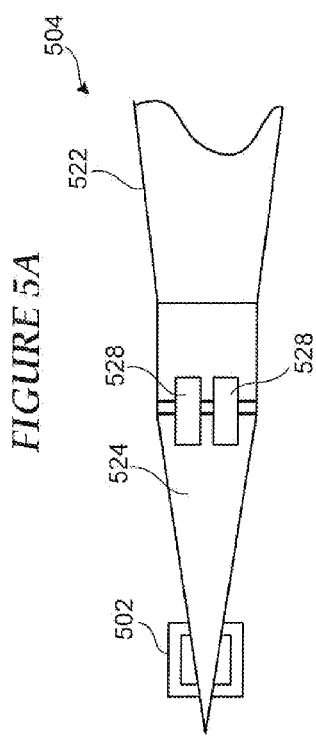
FIG. 5A illustrates a dual stage actuator of the type shown in FIG. 4A in accordance with various embodiments.

FIG. 5A illustrates a dual stage actuator 504 of the type shown in FIG. 4A in accordance with various embodiments. A multiplicity of the dual stage actuators 504 are shown in the embodiment of a hard disk drive (HDD) 500 illustrated in FIG. 5B. The HDD 500 includes a base 505 and a plurality of substantially parallel data storage disks 511, for example magnetic storage disks, having data storage tracks defined on both a lower surface and an upper surface. The data storage disks 511 are mounted about a spindle 517 and are interconnected to the base 505 by a spindle motor 513 mounted within or beneath a hub (not shown), such that the disks 511 can be rotated relative to the base 505.

Figure 5B:
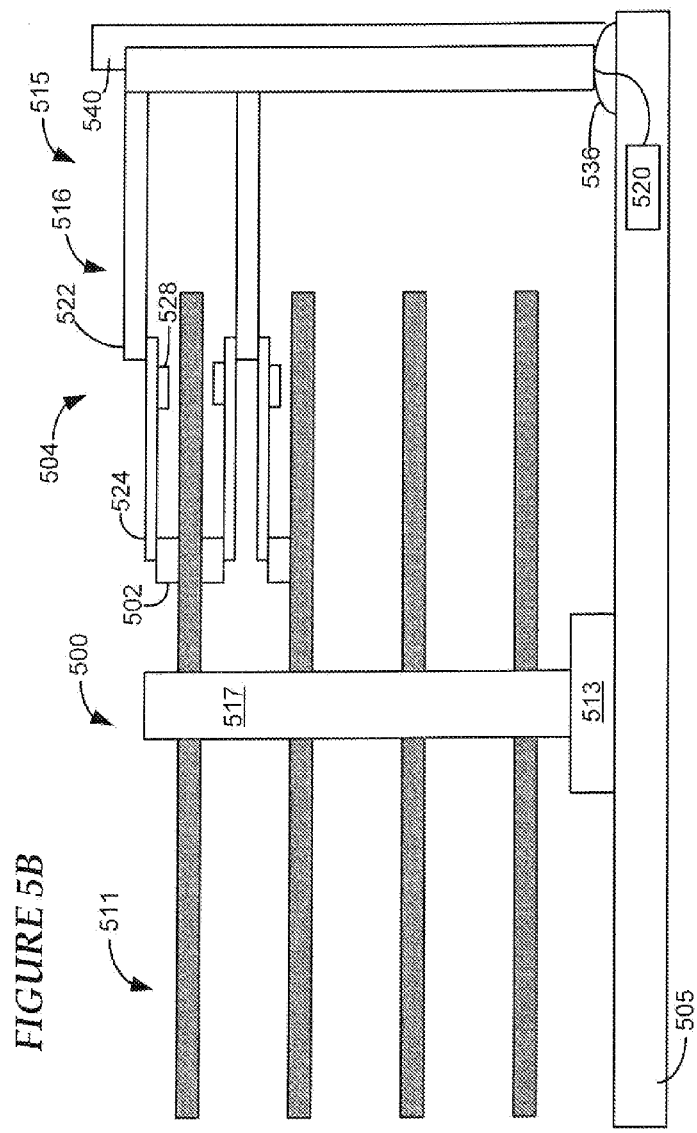
FIG. 5B is a side view of a head stack assembly which includes a multiplicity of actuator arms and magnetic recording disks, wherein each of the actuator arms incorporates a microactuator in accordance with various embodiments.

The HDD 500 shown in FIG. 5B is provided with a head stack assembly 515 that includes an actuator 540 to which each of a multiplicity of actuator arm assemblies 516 is connected. Each of the actuator arm assemblies 516 includes a DSA 504. The actuator 540 is interconnected to the base 505 by a bearing 536 upon which the actuator arm assemblies 516 pivot. The actuator 540 is coupled to a controller 520 which is configured to position the actuator 540 in response to servo control signals, such position error signals. The actuator 540 can be considered a course actuator that can pivot the head stack assembly 515 about the bearing 536 to position the DSAs 504 and, thereby, position each read/write head 502 with respect to the disk 511. In particular, the coarse actuator 540 positions each of the DSAs 504 to allow the read/write heads 502 to access different data tracks on the disks 511. Accordingly, the coarse actuator 540 can position the microactuators 528 and, thereby, the read/write heads 502 over a range of movement that may correspond to the distance between an inner and outer data storage track of the storage surface of the disks 511. The coarse actuator 540 may constitute, for example, a motor, such as a voice coil motor (VCM).

The DSA 504 shown in FIGS. 5A and 5B is part of an actuator arm assembly 516 that includes a first member 522 and a second member 524. The first member 522 and the second member 524 are coupled to provide two stages of movement. Interconnecting the first member 522 and the second member 524 is a microactuator 528. A read/write head 502 is mounted on a distal portion of the second member 524 so that it can be positioned adjacent to a storage surface of the magnetic recording medium (disk) 511. The read/write head 502 may, for example, comprise a magneto resistive (MR) element (read head) and/or a thin film inductive (TFI) element (write head).

The articulation of the second member 524 with respect to the first member 522 may be achieved, for example, by providing a journal bearing as part of the microactuator 528. The articulation may also be achieved by providing a flexible interconnection between the second member 524 and the first member 522, or by otherwise joining the second member 524 to the first member 522 in such a way that the second member 524 is allowed to move with respect to the first member 522.

The microactuator 528 is configured to position the read/write head 502 relative to the disk 511 over a range of movement that is less than the range of movement provided by the coarse actuator 540. As such, the microactuator 528 may affect finer positioning and/or higher frequency movements of the read/write head 502 within its range of movement (e.g., over relatively short distances), such as that which may be encountered during short seeks (e.g., a few tracks) or during track following. Accordingly, the microactuator 528 may move the read/write head 502 faster across the disk 511 within its range of movement, than may be possible with the coarse actuator 540. In some embodiments, the second member 524 may be eliminated by directly connecting the read/write head 502 to a surface or extension of the microactuator 528. The microactuator 528 may be any mechanism capable of moving the read/write head 502 relative to the disk 511 such as by adjusting the second member 524 of the actuator arm assembly 516 with respect to the first member 522. For example, the microactuator 528 may be a piezoelectric actuator, an electromagnetic actuator or an electrostatic actuator. FIG. 5A illustrates a representative embodiment where the microactuator 528 comprises a pair of piezoelectric (PZT) actuators.

Figure 6:
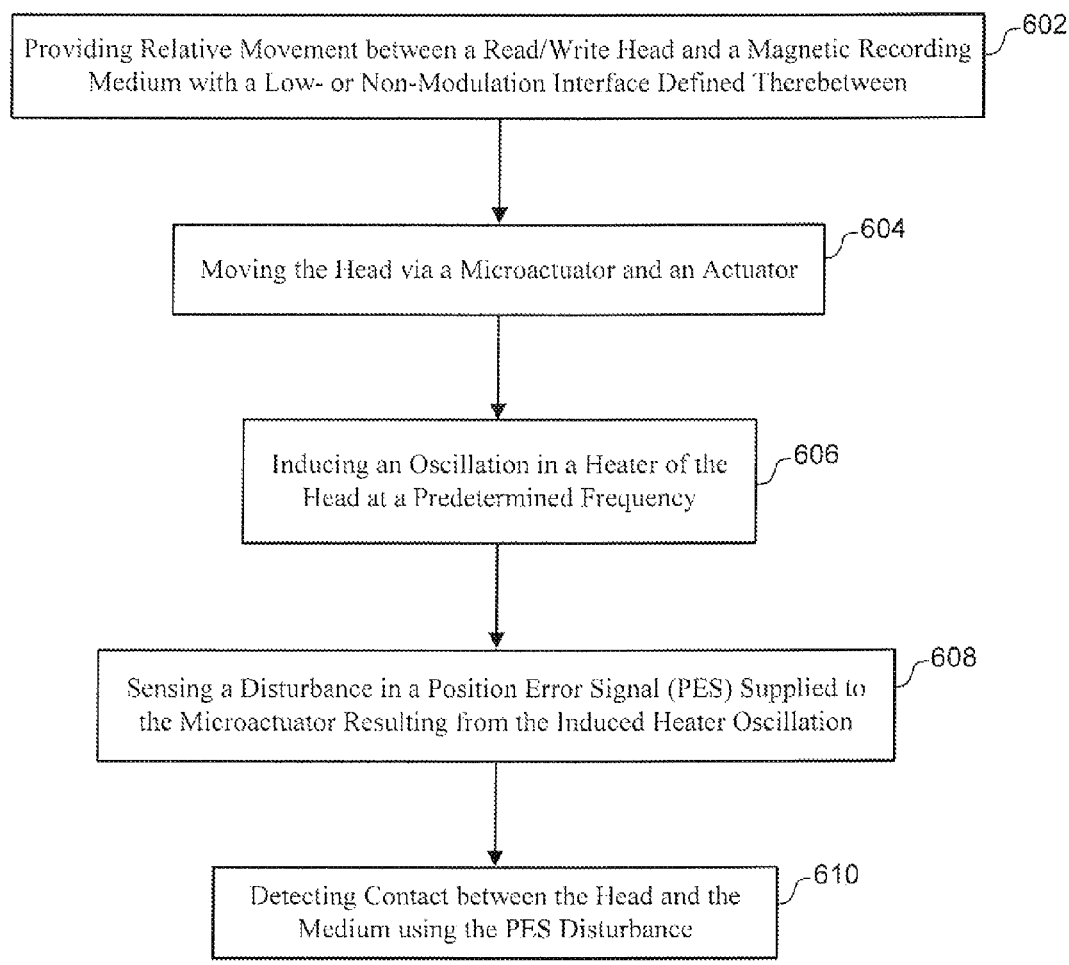
FIG. 6 is a flow chart showing various processes for detecting head-medium contact for a low- or non-modulation head-disk interface in accordance with various embodiments.

Turning now to FIG. 6, there is illustrated various processes for detecting head-medium contact for a low- or non-modulation head-disk interface in accordance with various embodiments. The method shown in FIG. 6 involves providing 602 relative movement between a read/write head and a magnetic recording medium with a low- or non-modulation interface defined therebetween. The method also involves moving 604 the head relative to the medium via a microactuator and an actuator. The method further involves inducing 606 an oscillation in the heater of the head at a predetermined frequency. As was discussed previously, the predetermined frequency is a frequency above about 1 kHz, such as above about 3-4 kHz. The method also involves sensing 608 a disturbance in a position error signal supplied to the microactuator resulting from the induced heater oscillation. The method further involves detecting 610 contact between the head and the medium using the detected PES disturbance. Head-medium contact can be detected by detecting an abrupt change in the PES that controls the microactuator at the predetermined frequency or a harmonic or sub-harmonic of the predetermined frequency.

Figure 7:
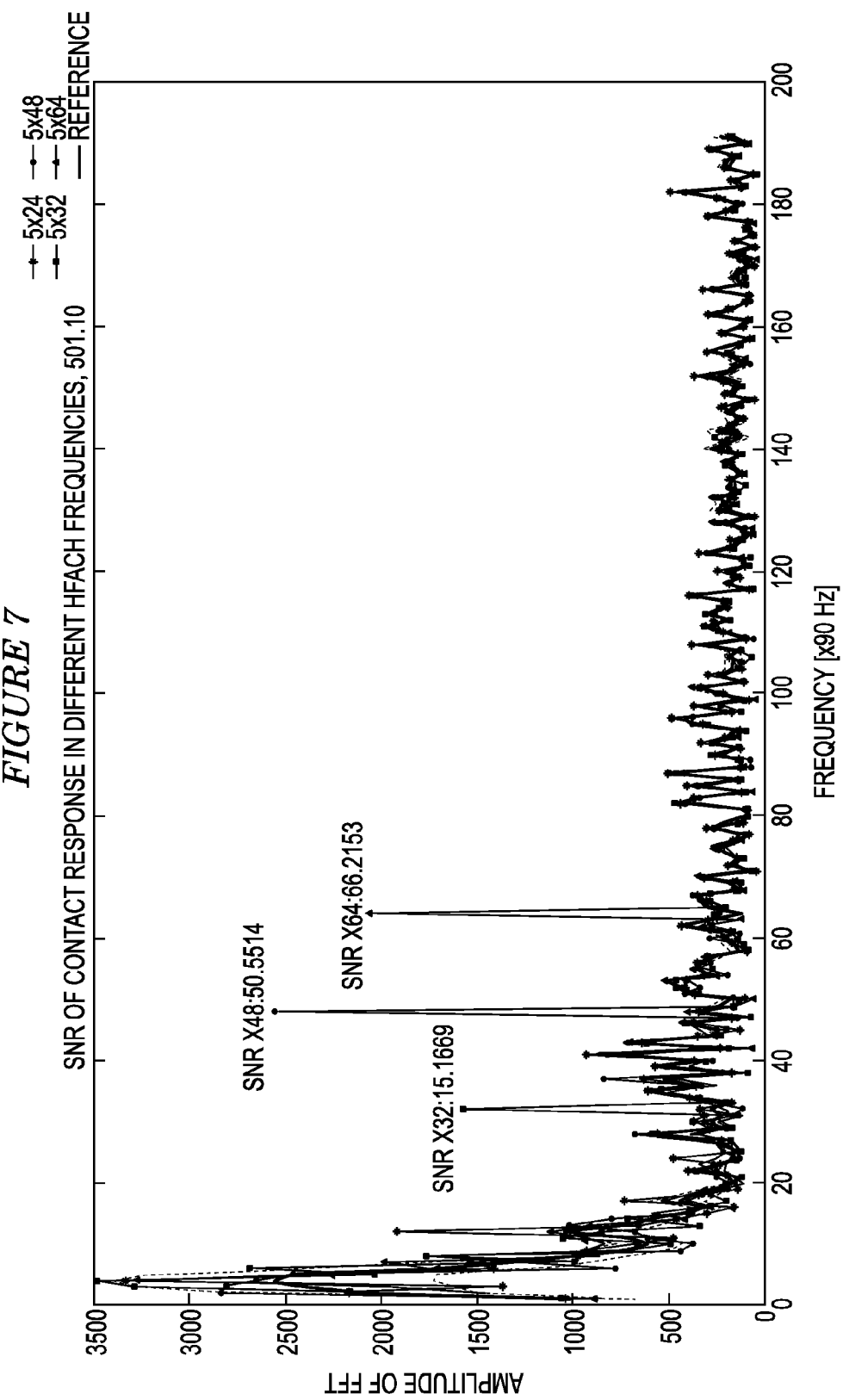
FIG. 7 is a graph showing the signal-to-noise ratio of a head-medium contact response of a slider at different heater oscillation frequencies in accordance with various embodiments.

FIG. 7 is a graph showing the signal-to-noise ratio (SNR) of a head-medium contact response of a slider at different HFACH frequencies in accordance with various embodiments. The x-axis of the graph is frequency (multiplied by 90 Hz) and the y-axis is amplitude of the Fast Fourier Transform (FFT) of the contact signal. The reference signal shown in FIG. 7 as the thick dark curve is the FFT result of the PES during a non-contact scenario. The graph of FIG. 7 is intended to show the difference in the FFT of the PES between contact and non-contact status. Four peaks, 702, 704, 706, and 708 are shown in FIG. 7, each indicating a sudden change of the PES spectrum resulting from head-medium contact when the oscillation frequency of the AC signal applied to the heater is 2160 Hz (24×90 Hz), 3240 Hz (36×90 Hz), 4320 Hz (48×90 Hz), and 5760 Hz (64×90 Hz), respectively. It is noted that, in this illustrative example, 90 Hz is a subharmonic of the rotational speed of the spindle motor (e.g., 5400 RPM). FIG. 7 demonstrates that by detecting a sudden change (e.g., peak) of the PES spectrum at a specified frequency (e.g., the oscillation frequency of the AC signal applied to the heater), head-medium contact events can be readily detected for a low- or non-modulation head-disk interface.

Figure 8:
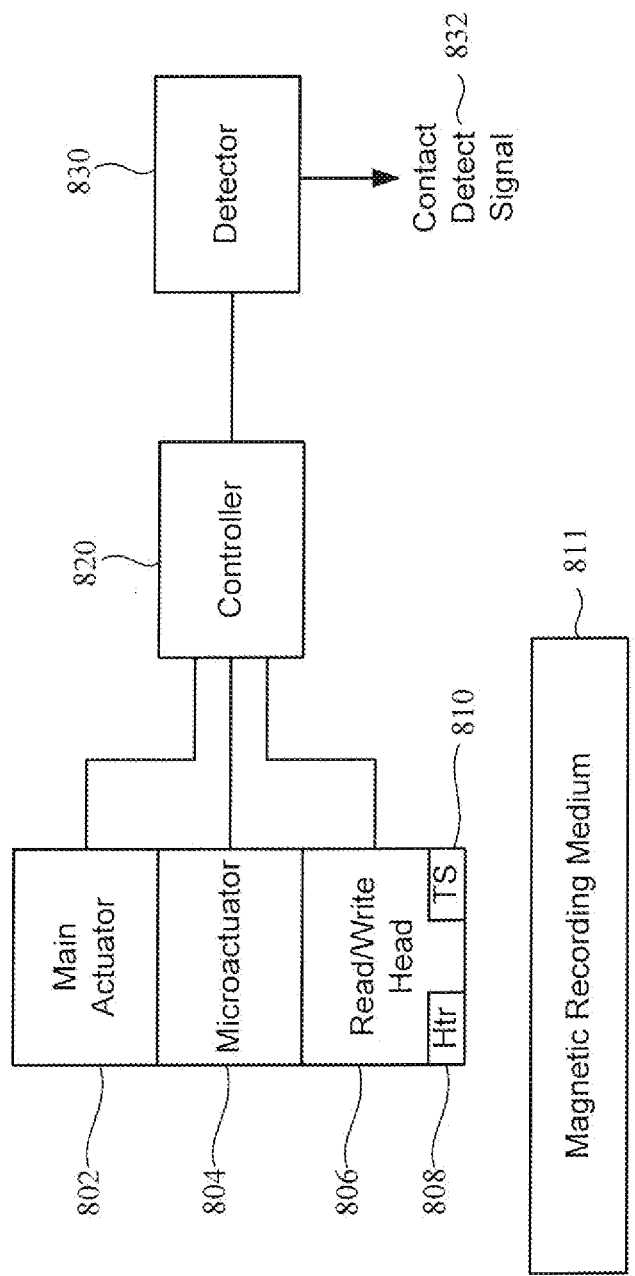
FIG. 8 is a block diagram of an apparatus configured to implement contact detection for a low- or non-modulation interface in accordance with various embodiments.

FIG. 8 is a block diagram of an apparatus configured to implement contact detection for a low- or non-modulation interface in accordance with various embodiments. The apparatus shown in FIG. 8 includes a read/write head 806 comprising a heater 808 positioned relative to a magnetic recording medium 811. A low- or non-modulation interface is defined between the read/write head 806 and the medium 811. A microactuator 804 is coupled to the head 806. A main actuator (e.g., a coarse actuator) 802 is coupled to the microactuator 804 and, therefore, to the head 806. The controller 820 is coupled to the main actuator 802, the microactuator 804, and the head 806. The controller 820 is configured to control movement of the main actuator 802 and the microactuator 804 in response to a position error signal. The controller 820 is further configured to induce an oscillation in the heater 808 at a predetermined frequency, and to implement head-medium contact detection in accordance with embodiments of the disclosure.

According to some embodiments, the predetermined frequency is preferably greater than a frequency at which the heater temperature can respond to the induced heater oscillation (e.g., >~1 kHz). In other embodiments, the predetermined frequency is preferably greater than a frequency bandwidth for controlling the main actuator 802. For example, the controller 820 can supply an AC signal to the heater 808 having a frequency greater than about 3-4 kHz. The predetermined frequency of the AC signal supplied to the heater 808 is such that the heater oscillates at frequencies that avoid the servo control frequency band used to control the voice coil motor. This allows for reliable detection of a head-medium contact signal using disturbances of the position error signal used to control the microactuator 804, as is discussed in greater detail hereinbelow. In some embodiments, the AC signal supplied to the heater 808 is a sinusoidal signal. In other embodiments the AC signal supplied to the heater 808 is a square signal. It has been found that a sinusoidal AC signal (e.g., DC heater DAC+/−delta*sin($\omega$)) provides for faster heater excitation as compared to a square wave, which corresponds to a clearer contact response signal.

A detector 830 is coupled to the controller 820. The detector 830 is configured to sense a disturbance in the PES supplied to the microactuator 804 resulting from the induced heater oscillation. The detector 830 is configured to detect contact between the head 806 and the medium 811 using the PES disturbance. For example, the detector 830 is configured to sense a disturbance of the PES indicative of a mechanical response of the microactuator 804 at the predetermined frequency due to contact between the head 806 and the medium 811. In some embodiments, the detector 803 compares the PES disturbance to a threshold, and declares a head-medium contact event in response to the change in the PES exceeding the threshold. For example, the threshold may be a percentage change or a fixed threshold. The detector 830 is configured to output a contact detect signal 832 in response to declaring a head-medium contact event.

In some embodiments, the detector 830 is configured to detect PES disturbances having a frequency equal to (or is a harmonic or sub-harmonic of) the frequency of the AC signal supplied to the heater 808. Because the PES disturbance frequency being monitored by the detector 830 is both known and beyond the frequency bandwidth for controlling the main actuator 802 (via the voice coil motor), changes in the PES indicative of head-medium contact can be readily detected by the detector 830, as is evidenced by the graph shown in FIG. 7.

In some embodiments, detecting PES disturbances for purposes of detecting head-medium contact as described hereinabove works very well for inner and outer diameter locations of the magnetic recording medium 811. At median (middle) diameter regions of the medium 811 (i.e., between inner and outer diameter regions of the medium 811), however, it may be desirable to use a different head-medium contact detection methodology in cases where a PES disturbance approach using a DSA response is not ideal. In some embodiments, head-medium contact detection for median diameter regions of the medium 811 can be implemented by use of the previously described dR/dP slope metric using a thermal sensor 810 of the head 806. It is understood that other head-medium contact detection techniques can be used at median diameter regions of the medium 811.

For example, and with reference again to FIG. 3, the detector 830 can be configured to sense for head-medium contact by monitoring the metric dR/dP. The detector 803 can be configured to monitor the ratio of dR/dP slope as it decreases due to a better cooling condition while the fly height of the head 806 decreases relative to the medium 811. The detector 803 can be configured to declare a head-medium contact event in response to the dR/dP slope reaching a minimum, which is followed by an increase due to frictional heating. Selective implementation of HFACH PES disturbance and dR/dP slope (or other contact detection technique) detection methodologies for different locations of the magnetic recording medium 811 can be determined at the time of manufacture. As such, the method of contact detection can be selected to provide enhanced detection of head-medium contact events based on the location of the read/write head 806 relative to the medium 811.

Figure 9A:
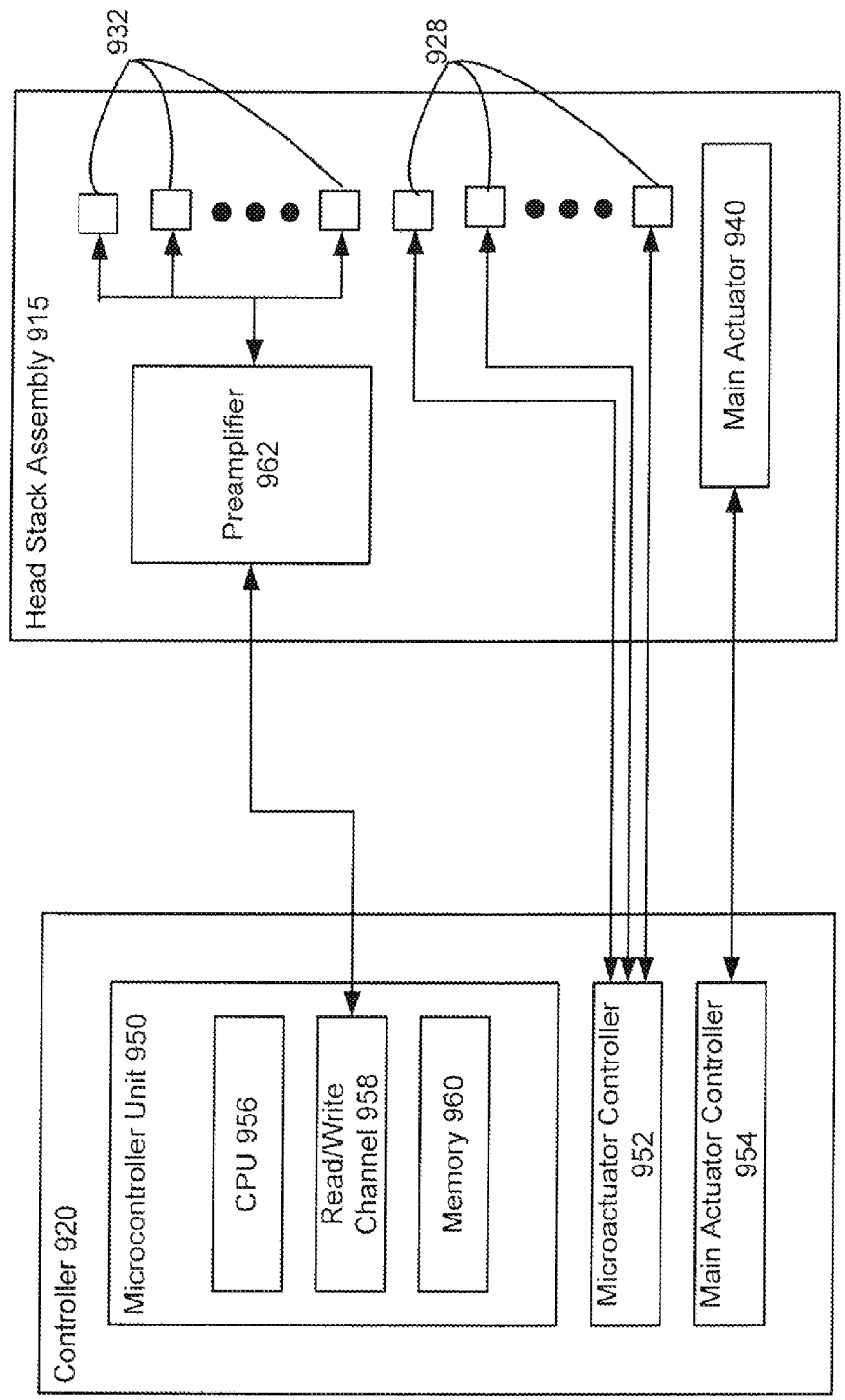
FIG. 9A is a block diagram of an apparatus for implementing contact detection for a low- or non-modulation interface using disturbance of a microactuator position error signal in accordance with various embodiments.

FIG. 9A is a block diagram of an apparatus for implementing contact detection for a low- or non-modulation interface using disturbance of a microactuator PES in accordance with various embodiments. The block diagram of FIG. 9A provides a simplified illustration of the relationship between the electronics of a controller 920 and the elements of an HDD head stack assembly 915. The electronics, provided via printed circuit board, present the controller 920 in the form of a microcontroller unit (MCU) 950, a microactuator controller 952 (e.g., PZT controller), and a coarse or main actuator controller 954 (e.g., voice coil motor controller). The MCU 950 generally includes a central processing unit (CPU) 956, read/write channel 958, and memory 960 (e.g., cache memory, flash memory, memory for firmware). The controller 920 may include other associated analog and/or digital circuitry as necessary to a specific application. The controller 920 sends control signals to a preamplifier 962 located within the head stack assembly 915, and the preamplifier 962 selects which of the plurality of read/write heads 932 to supply with current to enable a read or write operation. The controller 920 additionally sends signals from the microactuator controller 952 to the microactuators 928 and from the coarse actuator controller 954 to the coarse actuator 940 to position the selected read/write head 932 at a desired location relative its respective disk surface.

Figure 9B:
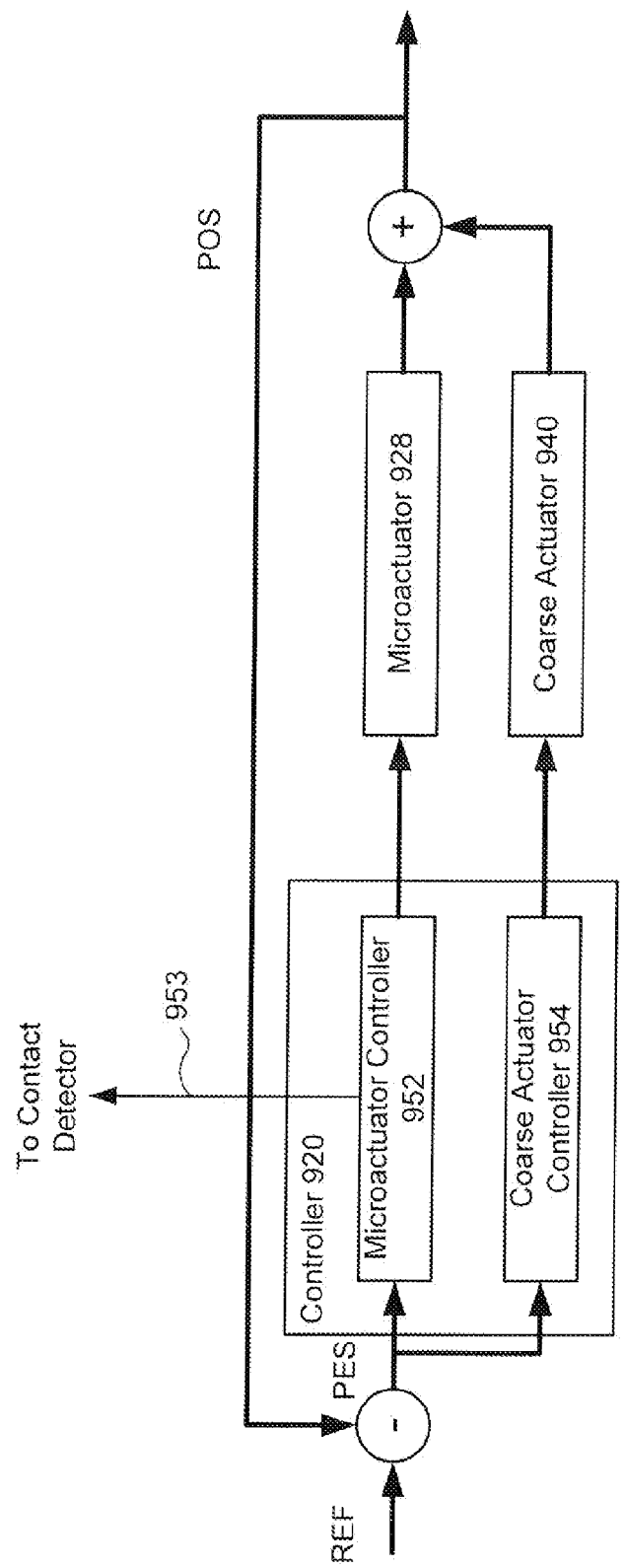
FIG. 9B is a block diagram showing a control scheme for controlling the movement of the microactuator and coarse actuator shown in FIG. 9A in accordance with various embodiments.

Movement of the micro and coarse actuators 928 and 940 to radially position the read/write heads 932 in the HDD is performed in accordance with the basic control scheme of FIG. 9B. As illustrated, a position reference signal, REF, indicating a desired position of the read/write head 932, is provided to a summing junction. The actual position, POS, of the read/write head 932, representing the sum of the microactuator 928 actual position and the coarse actuator 940 actual position, is also provided at the summing junction. A read/write head position error signal, PES, is then generated from the summing junction by subtracting the actual position from the desired position, i.e., REF−POS=PES. The PES signal is provided to the controllers 952 and 954, which in response to the PES, move their respective actuators 928 and 940 to radially reposition the read/write head 932 with the goal of achieving the desired location. As such, a continuous closed loop control system utilizing the PES is established to continually correct the actual read/write head position to the desired position.

As is further shown in FIG. 9B, a control signal 953 produced by the microactuator controller 952 (or the PES received by the microactuator controller 952) is communicated to the head-medium contact detector, such as detector 830 shown in FIG. 8. The control signal 953 (or the PES signal received by the microactuator controller 952) contains information indicative of the effort required by the microactuator 928 to compensate for the off-track motion of the read/write head 932 due to contact with the recording medium (i.e., due to PES disturbance at the frequency of the AC signal input to the heater). An abrupt change in the microactuator control effort (e.g., APES to the microactuator 928>threshold) as detected by the detector is indicative of contact between the read/write head 932 and the recording medium.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
providing relative movement between a read/write head and a magnetic recording medium wherein a low- or non-modulation interface is defined between the head and medium, the head movable by a microactuator and a main actuator;
inducing an oscillation in a heater of the head, the oscillation being at a predetermined frequency;
sensing a disturbance in a position error signal (PES) supplied to the microactuator resulting from the induced heater oscillation; and
detecting contact between the head and the medium using the PES disturbance.

2. The method of claim 1, wherein the predetermined frequency is greater than a frequency bandwidth for controlling the main actuator.

3. The method of claim 1, wherein the heater is oscillated at a frequency greater than about 3 kHz.

4. The method of claim 1, wherein the sensed disturbance of the PES is indicative of a mechanical response of the microactuator at the predetermined frequency due to contact between the head and the medium.

5. The method of claim 1, wherein:
the head is induced to oscillate along a z-direction normal to a plane of the medium in response to the heater oscillation; and
the sensed disturbance of the PES is indicative of a mechanical response of the microactuator along an x-direction parallel with the plane of the medium.

6. The method of claim 1, wherein:
the heater is a heater proximate a reader of the head; and
the method is performed during a read operation.

7. The method of claim 1, wherein:
the heater is a heater proximate a writer of the head; and
the method is performed during a write operation.

8. The method of claim 1, further comprising:
detecting contact between the head and the medium using the PES disturbance for inner and outer diameter regions of the medium; and detecting contact between the head and the medium using a parameter other than the PES disturbance for a middle diameter region of the medium.

9. The method of claim 8, wherein:
the head comprises a thermal sensor; and
detecting contact between the head and the medium for the middle diameter region of the medium comprises detecting the contact using the thermal sensor.

10. The method of claim 1, wherein contact between the head and the medium is detected as a change in the PES that exceeds a threshold.

11. The method of claim 1, wherein the induced heater oscillation is a sinusoidal oscillation.

12. An apparatus, comprising:
a read/write head comprising a heater, wherein a low- or non-modulation interface is defined between the head and a magnetic recording medium;
a microactuator coupled to the head;
a main actuator coupled to the microactuator and the head;
a controller coupled to the main actuator, the microactuator, and the head, the controller configured to control movement of the main actuator and the microactuator in response to a position error signal (PES), the controller further configured to induce an oscillation in the heater, the oscillation being at a predetermined frequency; and
a detector coupled to the controller, the detector configured to:
sense a disturbance in the PES supplied to the microactuator resulting from the induced heater oscillation; and
detect contact between the head and the medium using the PES disturbance.

13. The apparatus of claim 12, wherein the predetermined frequency is greater than a frequency bandwidth for controlling the main actuator.

14. The apparatus of claim 12, wherein heater is oscillated at a frequency greater than about 3 kHz.

15. The apparatus of claim 12, wherein the sensed disturbance of the PES is indicative of a mechanical response of the microactuator at the predetermined frequency due to contact between the head and the medium.

16. The apparatus of claim 12, wherein:
the head is induced to oscillate along a z-direction normal to a plane of the medium in response to the heater oscillation; and
the sensed disturbance of the PES is indicative of a mechanical response of the microactuator along an x-direction parallel with the plane of the medium.

17. The apparatus of claim 12, wherein:
the heater is a heater proximate a reader of the head; and
the detector is configured to perform head-medium detection during a read operation.

18. The apparatus of claim 12, wherein:
the heater is a heater proximate a writer of the head; and
the detector is configured to perform head-medium detection during a write operation.

19. The apparatus of claim 12, wherein the detector is configured to:
detect contact between the head and the medium using the PES disturbance for inner and outer diameter regions of the medium; and
detect contact between the head and the medium using a parameter other than the PES disturbance for a middle diameter region of the medium.

20. The apparatus of claim 19, wherein:
the head comprises a thermal sensor; and
the detector is further configured to detect contact between the head and the medium for the middle diameter region using the thermal sensor.

21. The apparatus of claim 12, wherein the detector is configured to detect contact between the head and the medium as a change in the PES that exceeds a threshold.

22. The apparatus of claim 12, wherein the induced heater oscillation is a sinusoidal oscillation.

23. The apparatus of claim 12, wherein the read/write head is configured for heat-assisted magnetic recording.

* * * * *